United States Patent
Restum et al.

(10) Patent No.: US 10,929,820 B2
(45) Date of Patent: *Feb. 23, 2021

(54) PREDICTIVE REPLACEMENT FOR HEAVY MACHINERY

(71) Applicant: Joy Global Surface Mining Inc, Milwaukee, WI (US)

(72) Inventors: David Restum, Milwaukee, WI (US); Wesley Taylor, Glendale, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,724

(22) Filed: Nov. 7, 2019

(65) Prior Publication Data

US 2020/0074414 A1 Mar. 5, 2020

Related U.S. Application Data

(63) Continuation of application No. 15/992,528, filed on May 30, 2018, now Pat. No. 10,504,072.

(Continued)

(51) Int. Cl.
*G06Q 10/08* (2012.01)
*G06Q 10/00* (2012.01)
(Continued)

(52) U.S. Cl.
CPC ............ *G06Q 10/20* (2013.01); *E02F 3/142* (2013.01); *E02F 3/907* (2013.01); *E02F 9/2808* (2013.01)

(58) Field of Classification Search
None
See application file for complete search history.

(56) References Cited

U.S. PATENT DOCUMENTS

| | | | | |
|---|---|---|---|---|
| 5,224,282 A | * | 7/1993 | Swick | E02F 9/285 37/453 |
| 6,052,927 A | * | 4/2000 | Pippins | E02F 9/2825 37/446 |

(Continued)

FOREIGN PATENT DOCUMENTS

| | | |
|---|---|---|
| CN | 104018545 A | 9/2014 |
| WO | 2015126923 A1 | 8/2015 |
| WO | 2016115499 A1 | 7/2016 |

OTHER PUBLICATIONS

Chilean Patent Office Examination Report for Application No. 201801460 dated Nov. 22, 2019 (14 pages).

(Continued)

*Primary Examiner* — Jonathan M Dager
(74) *Attorney, Agent, or Firm* — Michael Best & Friedrich LLP

(57) ABSTRACT

Systems and methods for predicting replacement of a component of an industrial machine. One system includes an electronic processor configured to determine a wear rate of the component based on a current dimension of the component and historical dimensions of the component and determine a replacement cost for the component. Determining the replacement cost includes determining a cost of downtime for replacing the component based on a time for replacing the component and a downtime cost for the industrial machine during the time for replacing the component, a material cost in replacing the component, and an operating cost of the industrial machine associated with not replacing the component. The electronic processor is also configured to determine a replacement recommendation for the component based on the wear rate, the replacement cost, and discard criteria and output the replacement recommendation.

20 Claims, 10 Drawing Sheets

Related U.S. Application Data

(60) Provisional application No. 62/512,593, filed on May 30, 2017.

(51) Int. Cl.
  *E02F 3/90* (2006.01)
  *E02F 9/28* (2006.01)
  *E02F 3/14* (2006.01)

(56) References Cited

U.S. PATENT DOCUMENTS

| | | | |
|---|---|---|---|
| 6,175,934 B1 | 1/2001 | Hershey et al. | |
| 6,738,748 B2 | 5/2004 | Wetzer | |
| 6,990,390 B2 | 1/2006 | Groth et al. | |
| 7,143,007 B2 | 11/2006 | Long et al. | |
| 7,851,758 B1 | 12/2010 | Scanlon et al. | |
| 8,242,445 B1 | 8/2012 | Scanlon et al. | |
| 8,386,196 B2 | 2/2013 | Wagner et al. | |
| 8,411,930 B2* | 4/2013 | Ridley | E02F 9/2808 382/152 |
| 8,688,332 B2 | 4/2014 | Reiner et al. | |
| 8,738,304 B2 | 5/2014 | Hall et al. | |
| 8,757,730 B2 | 6/2014 | Wachsmann et al. | |
| 8,775,099 B2 | 7/2014 | Wagner et al. | |
| 8,822,922 B1 | 9/2014 | Scanlon et al. | |
| 8,843,279 B2 | 9/2014 | Tafazoli Bilandi et al. | |
| 8,954,241 B2 | 2/2015 | Ruth | |
| 9,030,332 B2 | 5/2015 | Tafazoli Bilandi et al. | |
| 9,121,697 B2 | 9/2015 | Marumoto et al. | |
| 9,169,623 B2 | 10/2015 | Rebinsky | |
| 9,238,491 B1 | 1/2016 | Hakes et al. | |
| 9,243,381 B2 | 1/2016 | Behmlander et al. | |
| 9,611,625 B2* | 4/2017 | Koetz | E02F 9/26 |
| 9,875,535 B2* | 1/2018 | Finch | G06K 9/52 |
| 9,880,075 B2* | 1/2018 | Finch | G06F 30/00 |
| 9,933,338 B2* | 4/2018 | Noda | G05B 23/024 |
| 9,934,624 B2* | 4/2018 | Lewis | G06F 16/955 |
| 10,008,050 B2* | 6/2018 | Merg | H04L 67/12 |
| 10,190,289 B2* | 1/2019 | Reyes-Rodriguez | G07C 5/0841 |
| 10,196,799 B2* | 2/2019 | Bjerke | E02F 9/2841 |
| 10,316,497 B2* | 6/2019 | Miller | E02F 9/2808 |
| 10,339,667 B2* | 7/2019 | Tafazoli Bilandi | G06T 7/70 |
| 10,504,072 B2 | 12/2019 | Restum et al. | |
| 10,657,721 B2* | 5/2020 | Yin | G06T 19/20 |
| 2010/0042952 A1* | 2/2010 | Geesey | G06Q 50/30 715/851 |
| 2010/0229044 A1* | 9/2010 | Fountain | G07C 5/0808 714/37 |
| 2012/0306916 A1* | 12/2012 | Marumoto | G01B 11/24 345/632 |
| 2013/0035875 A1* | 2/2013 | Hall | B02C 18/00 702/34 |
| 2013/0082846 A1 | 4/2013 | McKinley et al. | |
| 2013/0114878 A1* | 5/2013 | Scheid | G06T 7/001 382/141 |
| 2013/0185093 A1* | 7/2013 | Wittliff, III | G16H 50/20 705/2 |
| 2013/0255977 A1 | 10/2013 | Braunstein et al. | |
| 2013/0282336 A1* | 10/2013 | Maeda | G05B 23/02 702/184 |
| 2014/0105481 A1* | 4/2014 | Hasselbusch | G06T 7/0006 382/141 |
| 2014/0141744 A1* | 5/2014 | Miluzzo | G06F 9/5072 455/406 |
| 2014/0324364 A1 | 10/2014 | Wagner et al. | |
| 2015/0033597 A1* | 2/2015 | Kunz | E02F 9/2883 37/455 |
| 2015/0066286 A1* | 3/2015 | Connolly | G06Q 10/20 701/29.6 |
| 2015/0066291 A1 | 3/2015 | Johannsen et al. | |
| 2015/0067018 A1* | 3/2015 | Connolly | G06Q 30/016 709/202 |
| 2015/0085123 A1* | 3/2015 | Tafazoli Bilandi | G01S 17/86 348/148 |
| 2015/0149049 A1* | 5/2015 | Bewley | E02F 9/2816 701/50 |
| 2015/0227122 A1* | 8/2015 | Harkonen | G05B 13/048 700/275 |
| 2015/0233786 A1* | 8/2015 | Pieper | G01M 13/00 702/34 |
| 2015/0339810 A1* | 11/2015 | Lim | G06K 9/52 382/152 |
| 2016/0237640 A1* | 8/2016 | Carpenter | E02F 9/26 |
| 2017/0038281 A1 | 2/2017 | Dhorajiya et al. | |
| 2017/0067229 A1* | 3/2017 | Stock | E02F 9/2054 |
| 2017/0076365 A1* | 3/2017 | D'Souza | G06Q 40/00 |
| 2017/0091375 A1* | 3/2017 | Lu | G06Q 10/20 |
| 2017/0103506 A1* | 4/2017 | Dandibhotla | E02F 9/28 |
| 2017/0138019 A1* | 5/2017 | Nicoson | E02F 9/285 |
| 2017/0287124 A1* | 10/2017 | Lim | G06T 7/74 |
| 2017/0352199 A1* | 12/2017 | Finley | G06T 7/13 |
| 2018/0044895 A1* | 2/2018 | Rol Corredor | E02F 9/2833 |
| 2018/0089823 A1* | 3/2018 | Carpenter | G07C 5/006 |
| 2018/0095609 A1* | 4/2018 | Merg | G06F 3/0482 |
| 2018/0165884 A1* | 6/2018 | Wagner | H04N 5/23293 |

OTHER PUBLICATIONS

Chilean Patent Office Examination Report for Application No. 201801460 dated May 5, 2020 (11 pages).

* cited by examiner

PREDICTIVE REPLACEMENT FOR HEAVY MACHINERY

RELATED APPLICATIONS

This application is a continuation of U.S. patent application Ser. No. 15/992,528, filed May 30, 2018, which claims priority to U.S. Provisional Patent Application No. 62/512,593, filed May 30, 2017, and the entire content of both prior-filed applications is incorporated by reference herein.

FIELD

Embodiments described herein relate to detecting wear of heavy machine components, such as heavy machine teeth and, in particular, using detected wear to predict when such components should be replaced or repaired.

BACKGROUND

Heavy machines (for example, mining equipment, such as draglines and shovels) often include components that wear over time. For example, shovels and excavators include buckets with ground engaging tooling (GET), such as steel teeth. The teeth provide a smaller surface area when digging into the earth than the bucket. The smaller point of surface area helps to break up the earth and requires less force than the larger surface area of the bucket. In addition, as the teeth wear, the teeth can be replaced without requiring replacement of the bucket.

SUMMARY

The wear level of a tooth affects the productivity of the machine. For example, a worn tooth may require more force to penetrate material. Thus, worn teeth should be identified and replaced as needed to maintain proper productivity levels. Some methods for monitoring tooth wear are subjective and inconsistent. For example, experienced mining personnel may visually inspect a tooth for wear and estimate when a tooth should be replaced based on a perceived wear level and historical experience. Such personnel, however, may not be able to visually see the teeth during active operation of the machine due to the position of the machine, other machines or other objects in the mining environment, dust and debris, or the like. Furthermore, even when the teeth are visible, replacement decisions are subjective. Accordingly, teeth may be replaced too early, which is costly and causes unnecessary downtime for the machine. Conversely, teeth may be allowed to wear beyond an optimized wear level, which may cause a drop in productivity, machine damage, or machine failures. Similarly, even if automated systems are used to detect a wear level of a tooth, personnel still need to make a subjective determination when a tooth should be replaced, which reintroduces the possibility of error or inconsistencies and may fail to take into account other factors, such as productivity levels, downtime considerations, mining conditions, or other factors that influence a rate of wear of a tooth.

Thus, embodiments described herein provide methods and systems for detecting machine wear, such as tooth wear, and using the detected wear to predict when machine tooling or components should be replaced or repaired. One system includes a wear detection device and a controller. The wear detection device collects data regarding ground engaging tooling on an industrial machine. In some embodiments, the wear detection device collects the data using light detecting and ranging technology. For example, the wear detection device may include at least one light source and at least one sensor mounted on the industrial machine. When the industrial machine is a shovel the wear detection device may be mounted on a pulley of the shovel directed at a bucket of the shovel including a plurality of removable teeth.

The controller is configured to receive the data from the wear detection device, automatically determine a wear level of the ground engaging tooling based on the data, and automatically predict a replacement time for the ground engaging tooling based on the wear level. In some embodiments, the controller is configured to automatically predict the replacement time by predicting a future wear level for the ground engaging tooling based on usage of the industrial machine and a historical wear rate. The controller may also take into consideration a cost of performing a replacement (downtime, material, labor) as well as the productivity effect of the replacement on the industrial machine to determine an optimized replacement time.

The controller is also configured to output the replacement time, which may include outputting the replacement time to at least one display in real-time. The controller may also output the replacement time to a database that may collect replacement data from each of a plurality of industrial machines. The database may be accessible by at least one user device to allow users to view and manage replacement strategies and schedules for one or more industrial machines even when users are remote from the location of the industrial machines.

For example, one embodiment provides a system for predicting replacement of a component of an industrial machine. The system includes an electronic processor configured to determine a wear rate of the component based on a current dimension of the component and historical dimensions of the component and determine a replacement cost for the component. Determining the replacement cost includes determining a cost of downtime for replacing the component based on a time for replacing the component and a downtime cost for the industrial machine during the time for replacing the component, a material cost in replacing the component, and an operating cost of the industrial machine associated with not replacing the component. The electronic processor is also configured to determine a replacement recommendation for the component based on the wear rate, the replacement cost, and discard criteria and output the replacement recommendation.

Another embodiment provides a method for predicting replacement of a component included in an industrial machine. The method includes receiving, with an electronic processor, data collected by a wear detection device representing a current dimension of the component and comparing, with the electronic processor, the current dimension of the component to discard criteria, the discard criteria including a discard dimension of the component. In response to the current dimension of the component being less than the discard dimension of the component, the method includes discarding the component. In response to the current dimension of the component being greater than the discard dimension of the component, the method includes determining, with the electronic processor, a virtual measurement for the component at a future time, comparing, with the electronic processor, the virtual measurement for the component to the discard dimension, and, in response to the virtual measurement for the component being less than the discard dimension, adding, with the electronic processor, the component to used pool of components.

Yet another embodiment provides non-transitory, computer-readable medium storing instructions that, when executed by an electronic processor, perform a set of functions. The set of functions includes determining a replacement cost for a component of an industrial machine for each of a plurality of arrangements, determining a replacement recommendation for the component based on the replacement cost associated with each of the plurality of arrangements, and outputting the replacement recommendation. Determining the replacement cost includes determining a cost of downtime for replacing the component based on a time for replacing the component and a downtime cost for the industrial machine during the time for replacing the component, a material cost in replacing the component, and an operating cost of the industrial machine associated with not replacing the component.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more electronic processors. As such, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (for example, a system bus) connecting the components.

Figure 1:
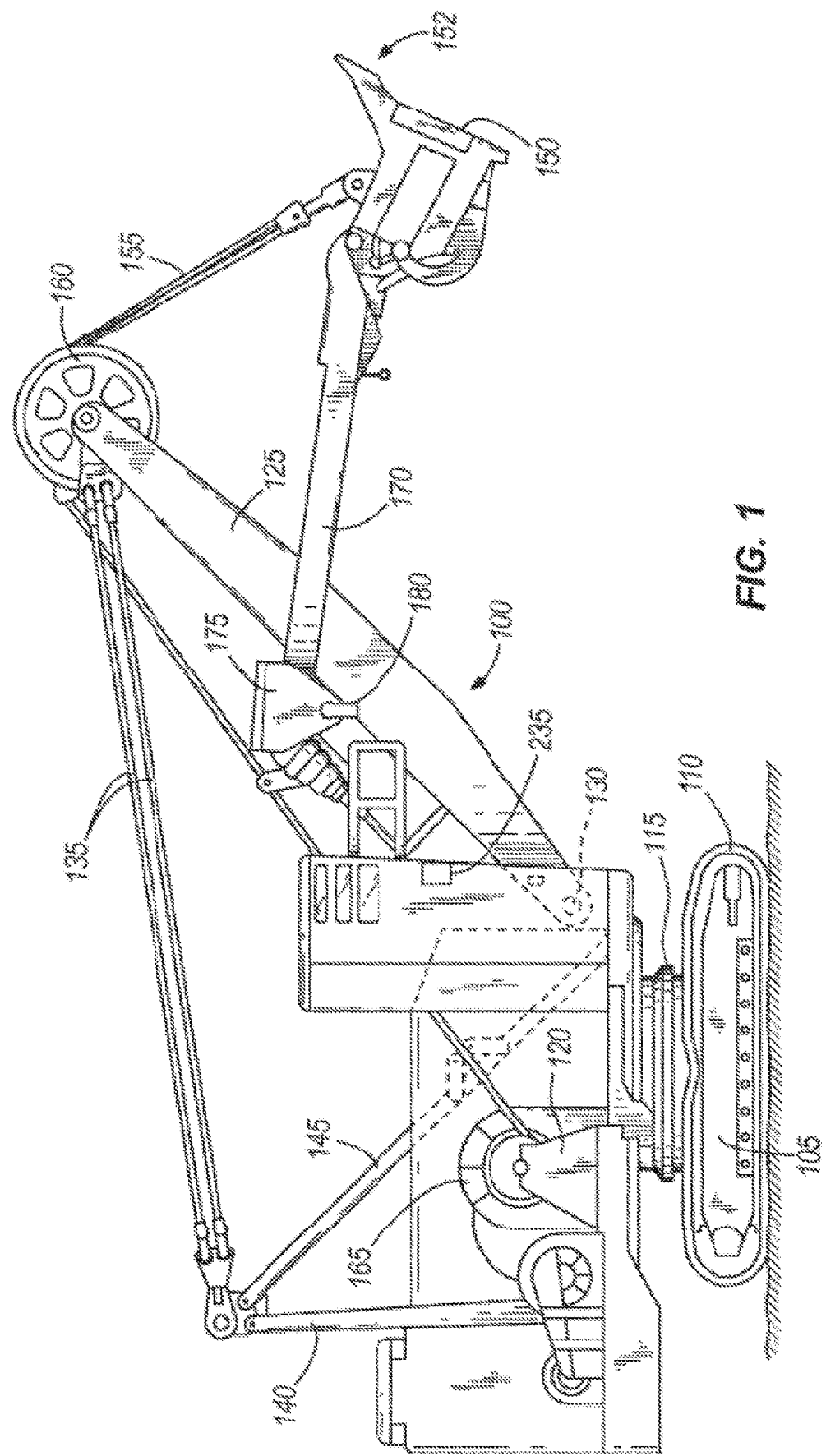
FIG. 1 is a side view of a shovel.

FIG. 1 illustrates a shovel 100. Although embodiments are described herein with respect to the shovel 100, the invention is not limited to the shovel 100. Rather, the methods and systems described herein may be used with other types of shovels and other types of machines and heavy machinery. Similarly, although embodiments are described herein with respect to detecting wear and predicting replacement or repair of teeth included in a shovel, the methods and systems described herein may be used to detect wear and predict replacement for other type of machine components that may wear over time, including other ground engaging tooling (GET) included in the shovel.

The shovel 100 includes a mobile base 105 supported on drive tracks 110. The mobile base 105 supports a turntable 115 and a machinery deck 120. The turntable 115 permits rotation of the machinery deck 120 relative to the base 105 (for example, approximately 360 degree rotation). A boom 125 is pivotally connected at a joint 130 to the machinery deck 120. The boom 125 is held in an upwardly and outwardly extending relation to the deck 120 by a brace or gantry in the form of tension cables 135 that are anchored to a back stay 140 of a stay structure 145 rigidly mounted on the machinery deck 120.

The shovel 100 also includes a dipper or bucket 150 that includes a plurality of heavy machine teeth 152 (referred to herein individually as "tooth 152" and collectively as "teeth 152" or a "lip"). The bucket 150 is suspended by a flexible hoist rope or cable 155 from a pulley 160. The cable 155 is anchored to a winch drum 165 mounted on the machinery deck 120. As the winch drum 165 rotates, the cable 155 is either paid out or pulled in, which lowers or raises the bucket 150. The pulley 160 directs the tension in the cable 155 to pull straight upward on the bucket 150 to produce efficient dig force. The bucket 150 is rigidly attached to an arm or handle 170. The handle 170 is slidably supported in a saddle block 175, which is pivotally mounted on the boom 125 at a joint 180. The handle 170 has a rack tooth formation (not shown) that engages a drive pinion or shipper shaft (not shown) mounted in the saddle block 175. The drive pinion is driven by an electric motor and transmission unit 185 to extend and retract the handle 170 relative to the saddle block 175. The bucket 150 also includes a dipper door 190 (see FIGS. 6, 7, and 8) that is tripped (opened) to allow material included in the bucket 150 to be dumped.

Figure 2A:
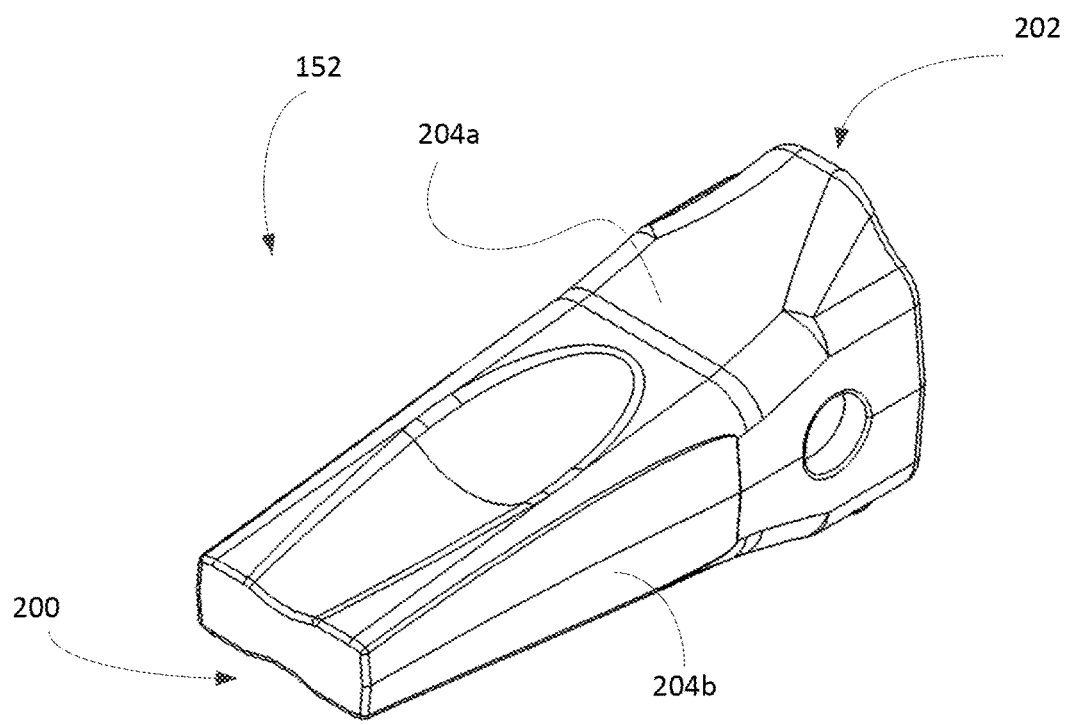
FIG. 2A is a perspective view of a tooth used with the shovel of FIG. 1.
Figure 2B:
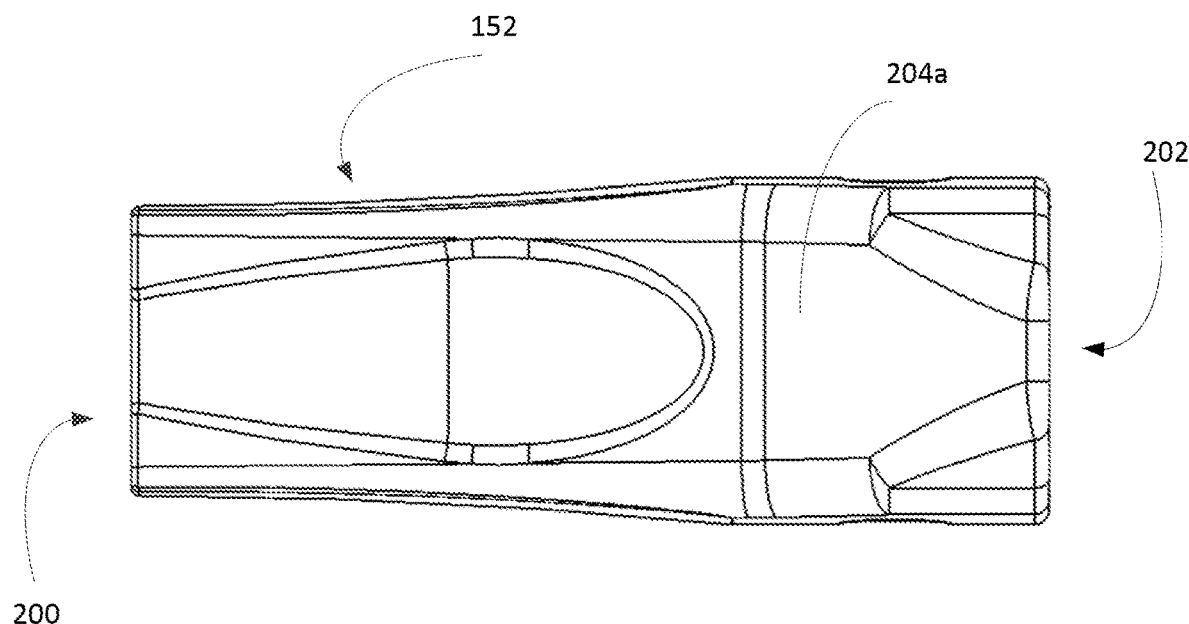
FIG. 2B is a top view of the tooth of FIG. 2A.
Figure 2C:
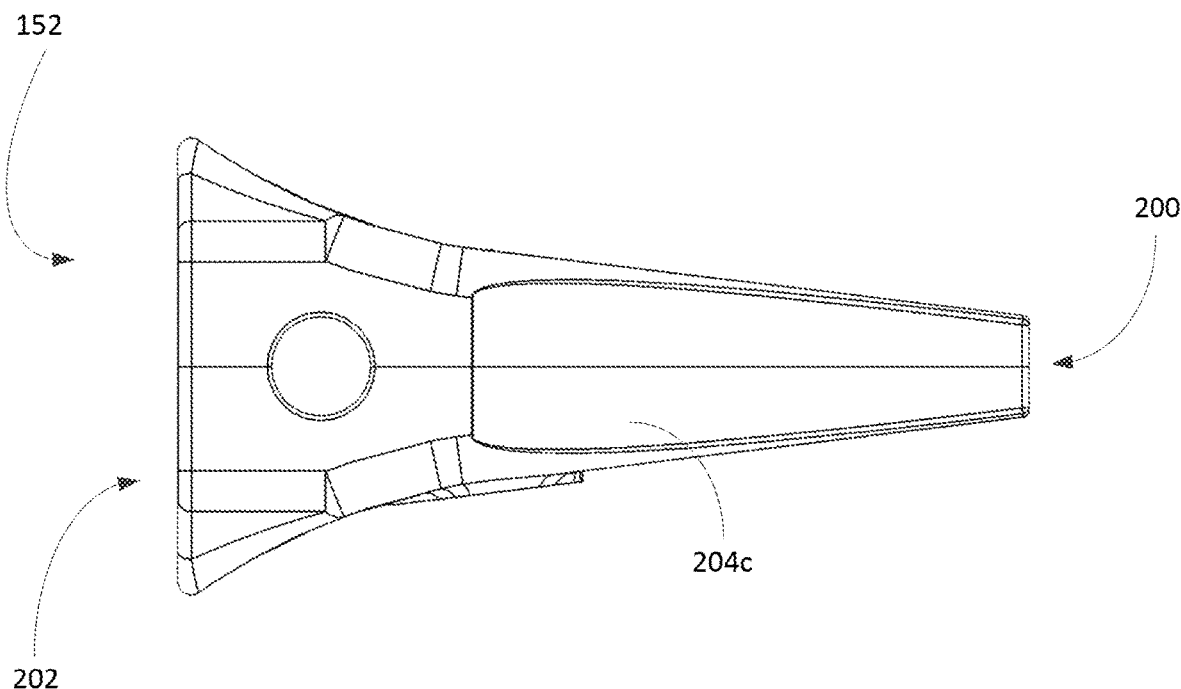
FIG. 2C is a side view of the tooth of FIG. 2A.

One or more of the teeth 152 are removably attached to the bucket 150. FIGS. 2A-2C illustrates one embodiment of a tooth 152. The tooth 152 is formed of a rigid material, such as steel. As illustrated in FIG. 2A, the tooth 152 includes a working end 200 and a mounting end 202 opposite the working end. The working end 200 is designed to interact with a working material (for example, stone, rock, rubble, and the like). The mounting end 202 is designed to removably couple the tooth 152 to the bucket 150. In some embodiments, the mounting end 202 is attached directly to the bucket 150. In other embodiments, the mounting end 202 is attached indirectly to the bucket 150, such as through an adapter (mounting bracket) or another intermediary device that couples the tooth 152 to the bucket 150. As illustrated in FIGS. 2C and 4B, the tooth 152 includes a top surface 204a, a left side surface 204b, a right side surface 204c, and a bottom surface 204d. As used in the present application, "left" and "right" are referenced from a point of view measured from the mounting end 202 to the working end 200. In some embodiments, the tooth 152 is molded from steel.

Figure 3:
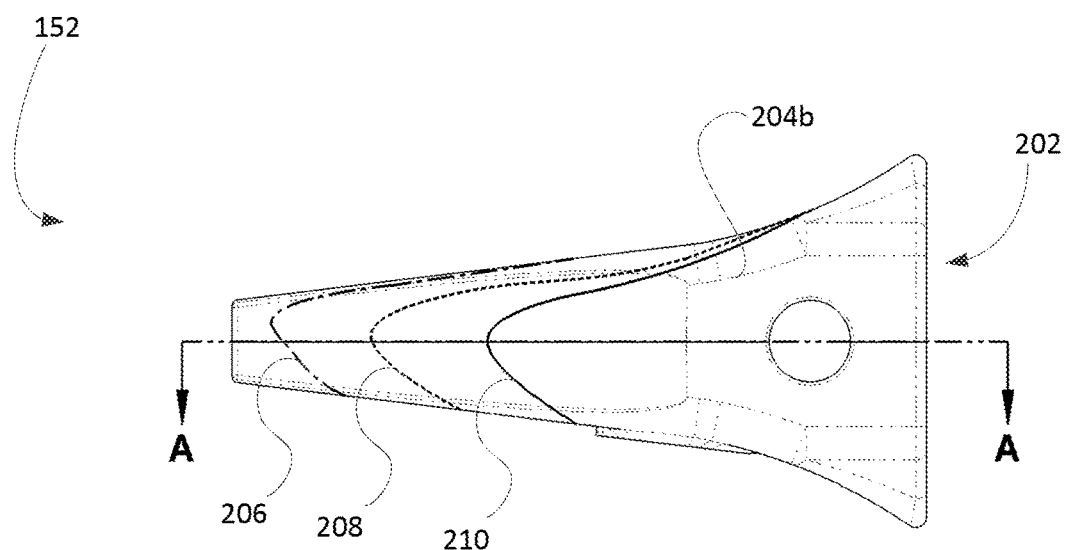
FIG. 3 is a side view of the tooth of FIG. 2A illustrating a plurality of wear levels.

As the shovel 100 digs, the teeth 152 are subjected to abrasive wear caused by interaction with the working material. The level of wear experienced by a tooth 152 depends on, for example, the working material (for example, a more abrasive material causes greater abrasive wear to the tooth 152 than a less abrasive material), the duration of use of the tooth 152 (for example, a longer duration of use will generally cause greater wear to the tooth 152 than a shorter duration of use), or a combination thereof. FIG. 3 illustrates a plurality of wear levels of the tooth 152. In particular, FIG. 3 illustrates a first wear level 206, a second wear level 208, and a third wear level 210 of the tooth 152. Wear levels closer to the mounting end 202 are considered higher or greater (for example, more material of the tooth 152 has worn away) than wear levels closer to the working end 200. For example, the first wear level 206 indicates a lower wear level than the second wear level 208 and the second wear level 208 indicates a lower wear level than the third wear level 210.

As noted above, as a tooth 152 wears, mining production may suffer as, in general, a dull or worn tooth may not penetrate or mine working material as efficiently as a non-worn tooth. However, replacing teeth 152 too frequently is costly both in terms of machine components and downtime for the shovel 100. Similarly, allowing a tooth 152 to get too worn is costly in terms of production.

Figure 4:
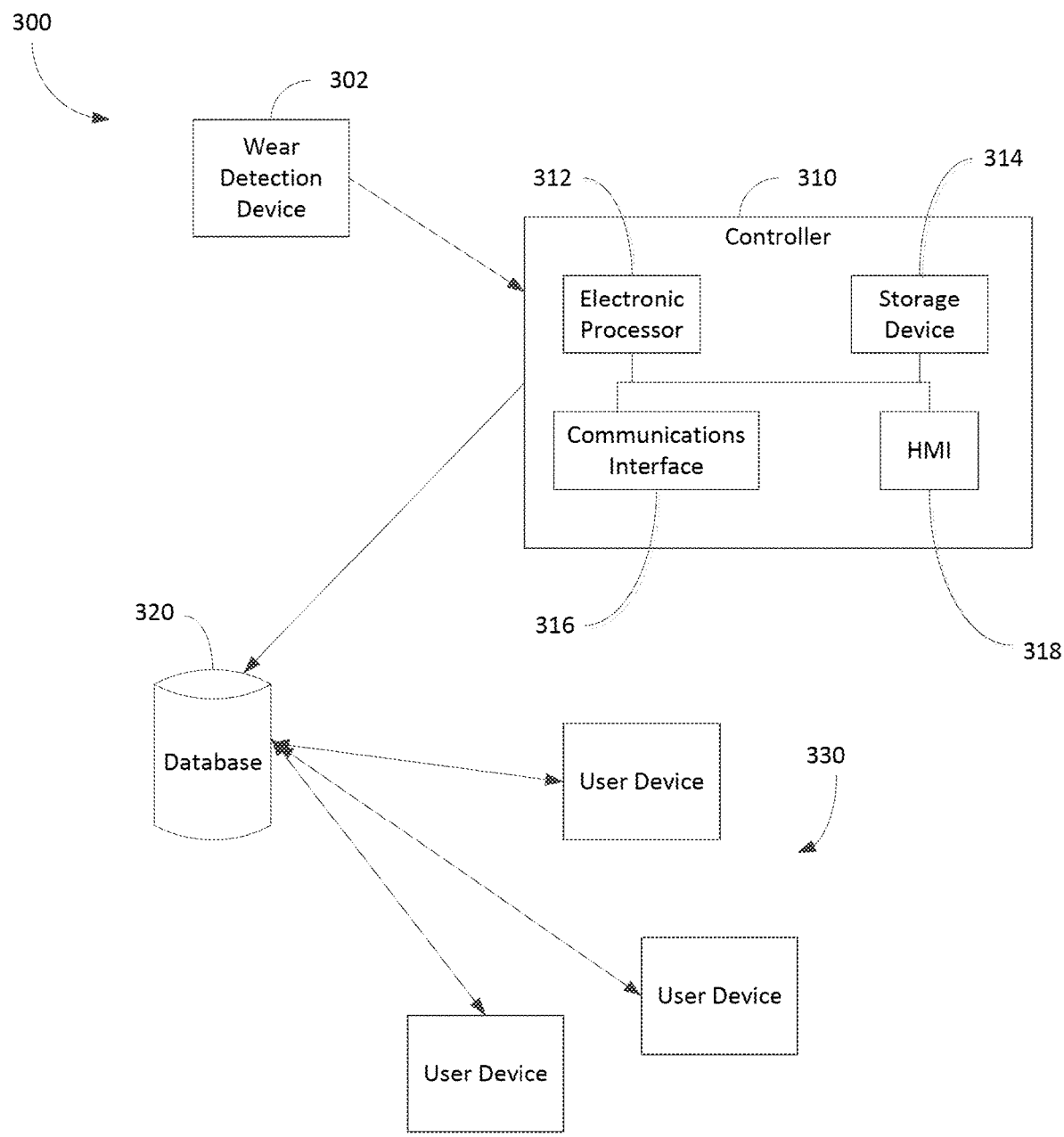
FIG. 4 schematically illustrates an automated system for detecting wear of a tooth included in the shovel of FIG. 1 and predicting replacement times for the tooth.

Accordingly, FIG. 4 schematically illustrates an automated system 300 that detects wear of a tooth 152 and predicts when the tooth 152 should be replaced. As used in the present application, "replacing" a tooth includes (i) removing the tooth and replacing the tooth either with a new tooth or a used tooth (from a pool of used teeth), (ii) swapping a tooth with a used tooth, which could be in the pool of used tooth or another tooth currently installed on the shovel 100, or (iii) repairing a tooth. Removal of a tooth may be required when, based on a current wear rate for the tooth in its current portion, the tooth will not last (maintain a length greater than the discard length) until a subsequent service opportunity. For example, service opportunities may occur regularly, such as approximately every day or every other day. If a removed tooth wouldn't last in its current position but may last in another position, such as a position with a lower wear rate, the removed tooth may be added to the pool of used teeth (sometimes referred to herein as the "used pool").

Swapping may occur when a tooth needs to be removed (see previous paragraph) but may also occur when a tooth does not need to be removed. For example, as described in more detail below, rearranging currently-installed teeth may be evaluated during the methods described below to determine if swapping teeth at a given time will be cost effective. Accordingly, a tooth may be swapped even if removal is not required by the discard criteria. As noted above, the teeth included in the swap may include one or more teeth from the used pool, other teeth currently installed on the shovel 100, or a combination thereof. For example, even if there are no teeth in the used pool at a particular point in time, swapping currently-installed teeth may technically add teeth to the used pool when a tooth is removed as part of a swap. For example, if a lip includes nine teeth, all of these teeth could be considered part of the used pool as part of a potential swap, which allows all positions to be evaluated in all arrangements.

As illustrated in FIG. 4, the system 300 includes a wear detection device 302 configured to detect a wear level of a tooth 152. The wear detection device 302 may use various technologies to detect the wear level of a tooth 152. For example, the wear detection device 302 may use light, radar, infrared technology, radio frequency identification, ultrasonic technology, object recognition in image data, or other forms of non-contact detection to detect the size (one or more dimensions) of a tooth 152, which is used to determine the wear level of a tooth 152. In some embodiments, the wear detection device 302 includes one or more sensors mounted on the shovel 100 or remote from the shovel 100. The sensors may be positioned to view the tooth 152 during a dumping motion or another predetermined motion or state of the shovel 100 or the bucket 150. For example, the sensors may be configured to collect data when one or more conditions are satisfied, such as when the dipper door 190 has been tripped (opened) and a tooth 152 is exposed. Accordingly, in this situation, the sensors may collect data at each dump of materials from the bucket 150. To determine whether conditions are satisfied, the sensors may communicate with other systems or controls included in the shovel 100, such as a dipper door sensor. In other embodiments, the sensors may repeatedly collect data untethered to whether any conditions are satisfied. In this situation, the collected data may be subsequently processed to identify collected data relating to a tooth 152 as compared to other components of the shovel 100 or other objects within a mining environment, such as the working material.

Figure 5:
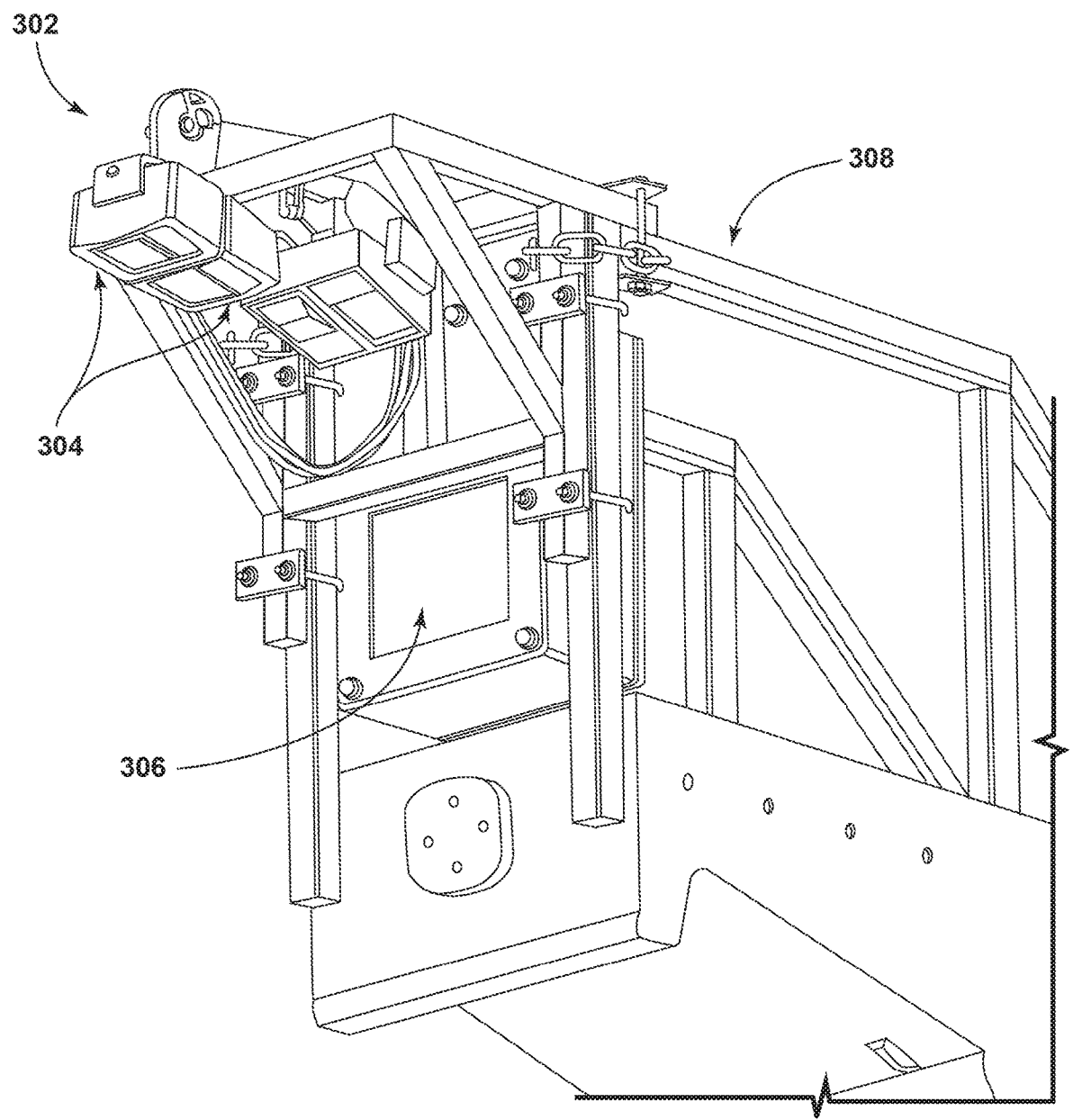
FIG. 5 illustrates a wear detection device included in the system FIG. 4.
Figure 6:
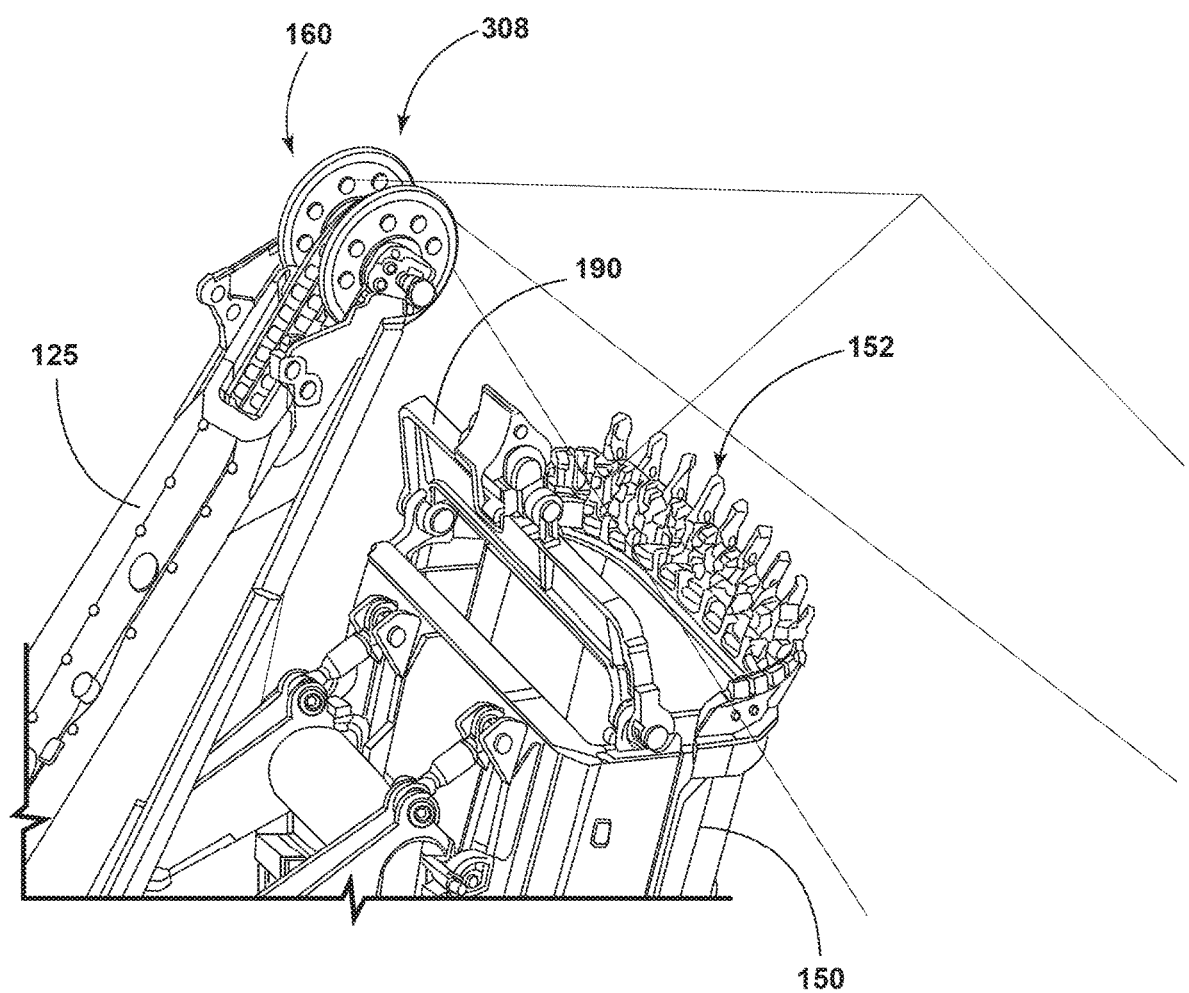
FIGS. 6, 7, and 8 illustrate the wear detection device of FIG. 5 mounted on the shovel of FIG. 1.
Figure 7:
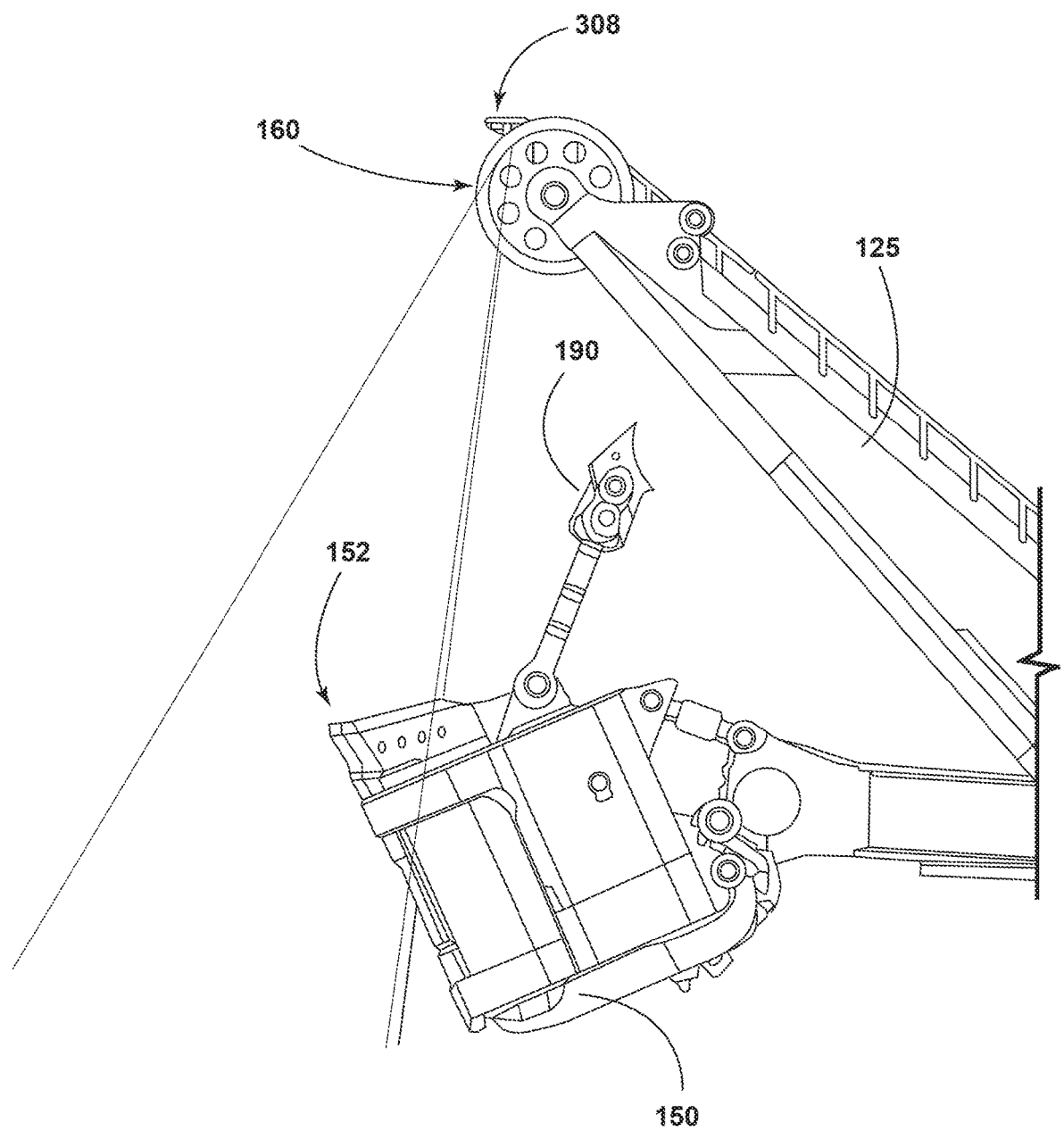
Figure 8:
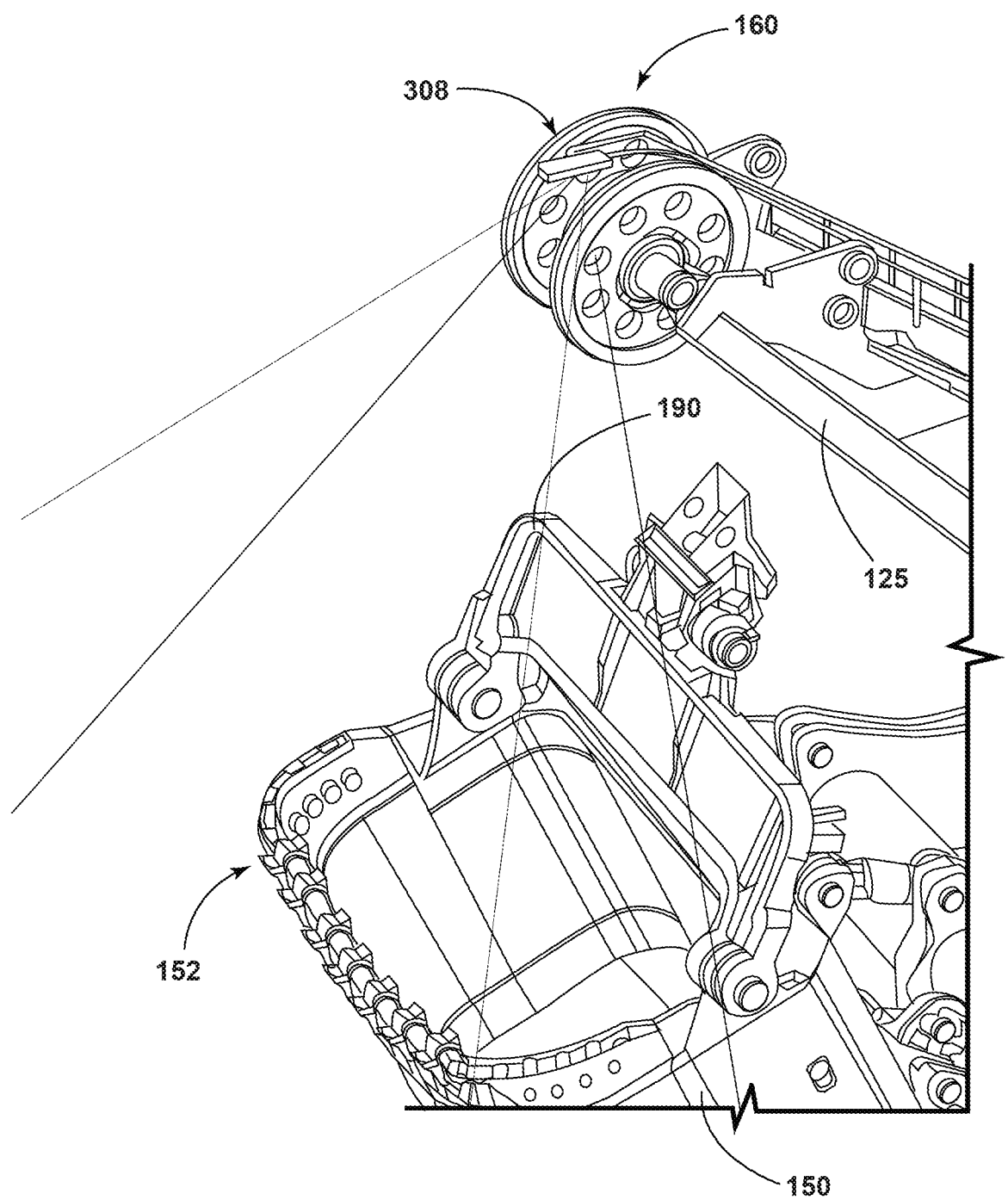

In one embodiment, the wear detection device 302 includes a light detecting and ranging technology (LIDAR) device as illustrated in FIG. 5. LIDAR technology measures distances to a target by illuminating the target with pulsed laser light and measuring the reflected pulses with a sensor. Differences in the return time and wavelengths of reflected pulses are used to generate digital representations of the target (point cloud data). Accordingly, in the embodiment illustrated in FIG. 5, the wear detection device 302 includes one or more light sources 304 and one or more light sensors 306. The light sources 304 include a laser configured to generate light pulses, and the reflections of such light pulses are detected by the light sensors 306. The light sources 304 and the light sensors 306 may be mounted on a bracket 308, which allows the wear detection device 302 to be mounted to the shovel 100. For example, as illustrated in FIGS. 6, 7, and 8, the bracket 308 may be mounted on the pulley 160 such that the light sources 304 are directed toward the teeth 152. As illustrated in FIGS. 6, 7, and 8, the dipper door 190 may block at least a portion of one or more teeth 152 when the dipper door 190 is closed. Accordingly, as noted above, the light sources 304, the light sensors 306, or both may be configured to activate and collect data when the dipper door 190 is tripped (opened) to allow for a less obstructed view of the teeth 152. It should be understood that the configuration and position of the wear detection device 302 illustrated in FIGS. 6, 7, and 8 represent one possible configuration and position and other configurations and positions (both on and remote from the shovel 100) are possible.

As illustrated in FIG. 4, a controller 310 communicates with the wear detection device 302, and, in particular, receives data collected by (or generated by) the wear detection device 302. In some embodiments, the controller 310 is included in the wear detection device 302 or is included in a common housing with the wear detection device 302. In other embodiments, the controller 310 is remote from the wear detection device 302 (on the shovel 100 or remote from the shovel 100) and communicates with the wear detection device 302 over a wired or wireless connection. It should be understood that the wear detection device 302 and the controller 310 may communicate directly or through one or more intermediary devices (routers, gateways, relays, and the like). Also, in some embodiments, the controller 310 communicates with multiple wear detection devices 302.

As illustrated in FIG. 4, the controller 310 includes an electronic processor 312 (for example, a microprocessor, an application-specific integrated circuit (ASIC), a field-programmable gate array (FPGA), or other suitable electronic device configured to process data), a storage device 314, and a communication interface 316. In some embodiments, the controller 310 also includes a human machine interface (HMI) 318. The electronic processor 312, the storage device 314, the communication interface 316, and the (optional) HMI 318 are communicatively coupled over one or more communication lines or buses, wirelessly, or combinations thereof. It should be understood that, in other constructions, the controller 310 includes additional, fewer, or different components than those illustrated in FIG. 4.

The controller 310 communicates with the wear detection device 302 via the communication interface 316. In some embodiments, the communication interface 316 includes a wireless transceiver for wirelessly communicating with the wear detection device 302, such as a radio frequency (RF) transceiver for communicating over a communications network (for example, the Internet, a local area network, Wi-Fi, Bluetooth, or a combination thereof). Alternatively or in addition, the communication interface 316 may include a port for receiving a cable, such as an Ethernet cable, for communicating with the wear detection device 302 (over a dedicated wired connection or over a communications network). In some embodiments, the wear detection device 302 includes a similar communication interface.

The storage device 314 includes a non-transitory, computer-readable storage medium storing program instructions and data. The electronic processor 312 is configured to retrieve instructions from the storage device 314 and execute the instructions to perform a set of functions, including the methods described herein. The HMI 318 receives input from and provides output to users, such as mining personnel in charge of monitoring the teeth 152 and replacing teeth 152 as necessary. The HMI 318 may include a keyboard, a keypad, a microphone, a camera, a cursor-control device (for example, a mouse, a joystick, a trackball, a touch pad, and the like), a display (for example, a liquid crystal display (LCD), a light emitting diode (LED) display, a touchscreen), a speaker, or combinations thereof.

The controller 310 (the electronic processor 312 through the execution of instructions) converts data collected by the wear detection device 302 into one or more parameters of a tooth 152, such as a size (at least one dimension) of the tooth 152 (for, example, length, width, volume, and the like). The controller 310 uses these parameters of the tooth 152 to predict an effective time to replace the tooth 152 (a replacement time). As noted above, replacing a tooth 152 includes shifting a position of a tooth 152 on the bucket 150, removing a tooth 152 from the bucket 150 and installing a new tooth 152 in its place, or, in some embodiments, repairing a tooth 152. The controller 310 may also consider other factors when predicting a replacement time. For example, the controller 310 may consider dig paths, bank shape and size, fragmentation, and previous wear history for a particular tooth 152 when predicting a replacement time. The controller 310 may consider all or some of these parameters in real-time or near real-time, which allows the controller 310 to provide replacement times in real-time or near real-time. As used in the present application, "real-time" means simultaneously (for example, within milliseconds) with actual values of one or more parameters. Accordingly, as the wear level of a tooth 152 or other parameters considered by the controller 310 change, the controller 310 may provide an updated predicted replacement time and associated replacement information.

The ability to determine recommended replacement times based on factors relating to actual detected wear as well as effective replacement strategies, wear for similar components, replacement times, productivity benefits, and replacement costs allows the controller 310 to provide an optimized replacement strategy. For example, in some embodiments, the controller 310 predicts tooth replacement based on a performance factor of the shovel 100 relating to energy usage, which allows the controller 310 to determine whether the cost of replacing a tooth 152 is more beneficial at a particular time to manage (save) shovel energy consumption.

In some embodiments, in addition to predicting a replacement time for a tooth, the controller 310 is also configured to determine a type of replacement tooth. For example, the controller 310 may have access to inventory information that the controller 310 may use to determine what type of teeth (new, refurbished, models, and the like) are available or will be available when a tooth 152 is replaced. In addition, given the rate of wear of current teeth 152, the controller 310 may be configured to recommend a type of replacement tooth 152 that is best suited for the mining conditions. For example, when teeth 152 are wearing quicker than expected, the controller 310 may recommend replacing worn teeth 152 with teeth 152 configured to withstand higher digging forces or teeth 152 that are engineered to work with particular mining conditions, such as hard working materials. It should also be understood that in addition to detecting worn teeth 152 and providing replacement times, the controller 310 may be configured to detect broken or missing teeth 152 and predict replacement times for replacing these teeth 152.

After predicting a replacement time (and other replacement information), the controller 310 may output this information to a user, such as a machine operator. This information may be output through the HMI 318 included in the controller 310. Alternatively or in addition, the controller 310 may transmit this information to a remote device, such as a display included in a cab of the shovel 100, for display to a user. Regardless of where the information is displayed, the outputted information may be displayed within one or more graphical user interfaces (GUI). In some embodiments, outputted information may include a number of days, working hours, or digging cycles remaining until replacement or an actual date or time of replacement. Alerts and other notifications may also be displayed (or separately transmitted via e-mail, text message, and the like) when particular wear levels have been detected or when teeth 152 have not be replaced as recommended. Accordingly, the information output by the controller 310 may identify or alert an operator to one or more conditions, including but not limited to when a replacement should be scheduled, when productivity or productivity loss drops below a particular threshold as a result of tooth wearing, critical tooth wear, and the like.

The controller 310 may be configured to output this information at various frequencies or in response to various trigger events, which may be based on user preferences. For example, in some embodiments, the controller 310 may output predicted replacement times in real-time or near real-time. In other embodiments, the controller 310 may output predicted replacement times as these times occur (or a predetermined time before they occur) to alert machine operators to upcoming replacements.

In some embodiments, the controller 310 also stores predicted replacement times (and other replacement information) to one or more databases or servers. For example, as illustrated in FIG. 4, the controller 310 may communicate with a database 320. The controller 310 may communicate with the database 320 via the communication interface 316 directly (for example, via a RF transmitter or a wired connection) or over a communications network. Also in some embodiments, the controller 310 communicates with the database 320 through one or more intermediary devices. For example, when the controller 310 communicates with the database 320 wirelessly, the shovel 100 may move out of range of the database 320 and lose its connection to the database 320. In these situations, an intermediary device may be used as a relay between the controller 310 and the database 320, which eliminates the need to shut down or move the controller 310.

As illustrated in FIG. 4, the database 320 is accessible (directly or over a communications network) by one or more user devices 330. The user devices 330 may include laptop computers, desktop computers, tablet computers, smart watches, smart phones, and the like and may include similar components as the controller 310 described above. Through the user devices 330, users may remotely access replacement information, such as through GUIs similar to those provided on-site or other types of reports or dashboards. The replacement information accessible through the database 320 may be associated with one or multiple different shovels (or other types of machines). For example, each shovel (or other piece of machinery) may be associated with a controller similar to the controller 310 described above, and each of these controllers may report respective replacement information to the database 320. Accordingly, through a user device 330, a user may access (real-time) replacement information for an entire mine or a fleet of heavy machines operating in different mines or locations. The user may use this information to manage replacements for multiple machines, which provides a further level of efficient management of replacements. For example, users may schedule replacements for one machine to coordinate with replacements scheduled for other machines (to make efficient use of maintenance teams or prevent multiple shovels from being down for maintenance at the same time). In some embodiments, the controller 310 may also be configured to access replacement information for other machines and use this information when predicting replacement times as described above.

It should be understood that, in some embodiments, the controller 310 stores replacement information locally (within the storage device 314), and the user devices 330 access the stored information on the controller 310 rather than or in addition to accessing the information stored in the database 320. Similarly, in some embodiments, at least a portion of the functionality described above with respect to controller 310 may be performed by the database 320 or another device. In other words, the functionality described above for the controller 310 may be distributed among multiple devices in various configurations.

Figure 9:
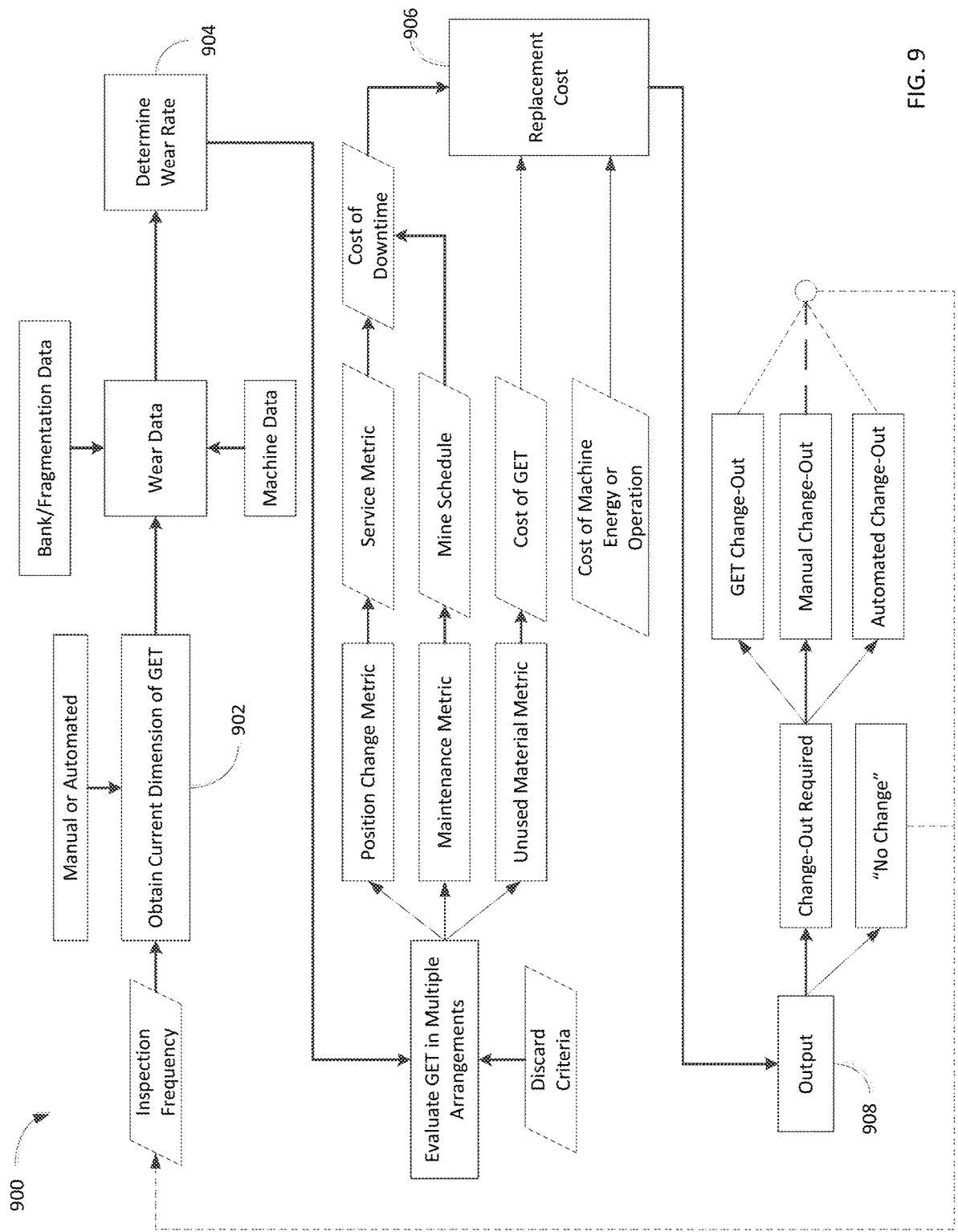
FIG. 9 is a flowchart illustrating a predictive replacement process performed by the system of FIG. 4 according to some embodiments.

FIG. 9 illustrates a method 900 performed by the controller 310 (the electronic processor 312 through execution of instructions) according to one embodiment to detect machine wear and automatically predict replacement. It should be understood, however, that portions of the method 900 may be performed by other components, including, for example, the wear detection device 302, the database 320, one or more servers (including servers provided in a cloud computing environment), or a combination thereof. The method 900 is described herein in terms of detecting a wear level in terms of length of a tooth 152. However, as noted above, this is just one example application of the method 900 and the method 900 may be applied to other types of GET where wear levels may be detected or defined differently. Also, the method 900 illustrated in FIG. 9 includes functional steps as well as some data input steps describing data that may be used as part of a particular functional steps. Accordingly, as compared to a traditional flowchart, the method 900 is represented graphically as a hybrid of functional steps and data inputs or constraints, intermediary steps, and the like.

As illustrated in FIG. 9, the method 900 includes obtaining a current dimension of the GET (at block 902). As illustrated in FIG. 9, the current dimension may be determined according to an inspection frequency, which may be set by a user, such as via the HMI 318 included in the controller 310. The inspection frequency defines an amount of times during a given duration that the current wear state is determined and recorded. Thus, the inspection frequency may be defined in terms of inspections-per-time-period.

As also illustrated in FIG. 9, such inspections can be performed manually or in an automated fashion, such as using LIDAR as described above with respect to the wear detection device 302. In some embodiments, a user may specify whether the inspections will be performed manually or automatically as part of specifying the inspection frequency. When recorded manually, such an inspection may require that the machine be locked-out and turned off. Thus, there is a cost associated with such downtime related to performing a manual wear component inspection. Also, the utilization of the machine may influence the inspection frequency. For example, a lower utilization allows for more opportunities to perform inspections. The more frequently inspections (and associated measurements) are made, the more effective the controller 310 is at predicting replacements. For example, when an inspection is manually performed once a day over a one hour period, the other twenty-three hours of the day are not considered, which may cause the controller 310 to overlook an efficient time for maintenance. In particular, although historical data provides an understanding of wear rates per position and how the bank, material, arrangement, or combination thereof affects such wear rates, there can be significant differences from one hour to another. Accordingly, increasing the inspection frequency increases wear rate accuracy and therefore prediction accuracy.

As noted above, a current wear level of GET can be detected in an automated fashion using LIDAR technology or other types of position sensing or tracking technologies. An automated method for evaluating and recording a dimension, such as length, of GET allows the controller 310 to perform the prediction in a more efficient and cost-effective manner than when a manual method for evaluating and recording a dimension are used. In particular, as noted above, manual recordings require personnel on-site to evaluate the dimensions of the GET, which adds to downtime costs, overall safety risks, and does not optimize change-out moments. For example, with LIDAR technology the inspection frequency may be infinite without adding cost. Analyzing real-time data can also allow wear rates to be weighted toward a current operating situation (for example, based on the material and bank being mined) rather than relying heavily on historical data, which improves the accuracy, reliability, risk prevention, and optimize the decision-making method 900.

As illustrated in FIG. 9, the controller 310 uses the current dimension (length) of the GET to determine a wear rate for the GET (at block 904). In some embodiments, the controller 310 uses wear data stored in one more databases (such as the database 320) to determine the wear rate. For example, as illustrated in FIG. 9, the controller 310 may access wear data that includes historical dimensions, wear rates, or both for the GET and the machine (and optionally other similar machines) as well as wear data for particular operating situations, such as particular materials, banks, fragmentation, or the like, of the GET and the machine (and optionally other similar machines). For example, GET measurements may be recorded either manually or in an automated fashion may be entered into a database. Each recording may also be associated with machine data, such as digs, duration of digging, payload, tooth travel distance, energy consumed, and the link, which the controller can use to determine wear rates. For example, the wear data may store previously recorded dimensions for the GET, which the controller can compare to a currently-determined dimension to calculate a wear rate for the GET. Alternatively or in addition, the controller 310 may access data regarding historical wear rates of other GET or other machines or data regarding wear rates for particular operating situations, which the controller 310 may use as the wear rate for the GET independently or in combination with an actual determined wear rate. For example, using historical data and actual current wear profiles may allow for accurate replacement predictions. It should be understood that, in some embodiments, the controller 310 determines a wear rate for each GET. However, in other embodiments, the controller 310 may be configured to determine a combined or aggregated (for example, average) wear rate for a multiple components.

As illustrated in FIG. 9, the controller 310 uses the determined wear rate (at block 904) to determine a replacement cost for the GET (at block 906), which is used to provide an output (at block 908) specifying whether a replacement is needed and, if so, when the replacement should be performed. The output may be provided via the HMI 318, via the database 320, or a combination thereof as described above. The output may be based on discard criteria, which may be entered by a user, such as via the HMI 318. The discard criteria may include a length, a volume, another variable that defines when a wear component needs to be replaced, or a combination thereof. In some embodiments, the discard criteria are not correlated with performance of the machine (shovel 100). Instead, the discard criteria may be defined by the minimum amount a wear component can be worn before there is an elevated risk of the component detaching from the machine (an adaptor or other locking tool) or causing wear on the adapter that may prevent a new component from replacing the current component.

As part of determining the replacement cost, the controller 310 may consider a position change metric, a maintenance metric, and an unused material metric. The position change metric may determine an amount of time needed to perform a replacement (for example, in terms of time), and the maintenance metric may take into consideration downtime costs associated with having the machine shut down during a replacement, which may vary based on a schedule for the machine or the operating environment (mine). The unused material metric may take into consideration a cost associated with discarding current GET as well an impact of the current or replacement GET on the operating costs of the machine.

For example, the position change metric may specify a service metric that represents, based on the GET type, an amount of time required to replace the GET (install a new or used component). This time may include a minimal time to take a piece of equipment down and an additional adder for each component thereafter. In some embodiments, this time is specified by the equation $y=mx+b$. The variable "m" in this equation is determined from time studies associated with replacing a wear component once the machine is set up for maintenance. This value may vary based on the type of change-out being performed (manual v. automated), the design of the GET, or a combination thereof. For example, the time associated with this variable could be reduced through the use of automated change-out methods.

The variable "x" in this equation is the position change metric that is determined by the number of positions that require a change from their current state (for example, a number of GET needing replacement). For example, when no change in position is required, the value of this variable may be set to "0." However, when the GET includes a lip and all of the teeth 152 need to be replaced, the value of this variable may be set to "9."

The variable "b" in this equation may also be determined from time studies for mine-specific requirements associated with approaching an operating piece of equipment, such as, for example, environmental variables, safety practices, lockout steps, and equipment type. Again, the value of this variable may vary based on the change-out type. For example, the value of this variable may be reduced through the use of automated change-out methods.

As illustrated in FIG. 9, the service metric, which may be in minutes, a cost of downtime, and a mine schedule may be used to determine the replacement cost (at block 906). The cost of downtime may be defined by the amount of currency (dollars) operation of the machine generates during a given timeframe, such as per minute, per hour, per day, or the like. Accordingly, the service metric (in minutes) may be multiplied by the cost of downtime to determine at least a part of the replacement cost. The cost of downtime may vary and, therefore, may allow for a constant and variable input. The variable input may be defined by an operating or mine schedule. For example, the type of ore or material being mined and how many trucks are available to be loaded may impact the cost of downtime. In fact, in some situations, the cost of downtime drops to zero given the correct correlation with a mine's schedule, such as a preventative maintenance day. In contrast, when mining heavy ore bodies, the cost of downtime may be so high that changing wear components may be undesirable at any length greater than the discard criteria.

As illustrated in FIG. 9, the other inputs that are used to determine the replacement cost (at block 906) may include the cost of the GET and the cost of machine energy or operation. The cost of the GET may be determined by the cost of an individual component's usable material. Usable material is defined as all material greater than the discard criteria. Accordingly, the cost of the GET may represent a currency amount (dollar amount) per metric or unit of unused material. When a component is removed and will not be replaced in a new position, the unused material is discarded and represents unused dollars of wear.

Machine (shovel) energy is determined by analyzing the energy consumed by the machine during operation, such as during a digging operation. The amount of energy consumed during digging may vary depending on the wear level (length) of the wear components in addition to an arrangement of the wear components. The increase in energy consumed with shorter wear components is thus a variable that impacts the replacement cost and, ultimately, decision making on whether and when a replacement should be performed.

As illustrated in FIG. 9, in some embodiments, the controller 310 determines the replacement cost (at block 906) for multiple physical arrangements for GET. For example, when the GET includes a lip, one or more teeth 152 included in a bucket 150 may be swapped or rearranged with existing teeth 152 on the bucket 150, may be replaced with new teeth 152, or a combination thereof. Thus, in this example, the controller 310 can be configured to determine a replacement cost for rearranging or swapping existing teeth 152, replacing one tooth 152, replacing two teeth 152, and so forth for multiple combinations including replacing all of the existing teeth 152 with new teeth. Accordingly, the controller 310 may be configured to evaluate each arrangement of the GET as described above to determine the most efficient action to take.

As noted above, the replacement cost (at block 906) is used to generate an output (at block 908) that indicates whether a change-out of the GET is recommended. If a change-out is recommended, the change-out may be performed manually or in an automated fashion. In some embodiments, the output from the controller 310 may specify or recommend a type of change-out or may provide statistics associated with type of change-out so that a user can weigh the costs associated with each type. As illustrated in FIG. 9, the output may be used as feedback by the controller 310 to further improve predictions. For example, when a large number or all of the teeth 152 on a bucket have been replaced, the inspection frequency may be reduced for a particular time period. Alternatively or in addition, after a tooth 152 is replaced, the inspection frequency may be increased to detect other teeth 152 that may need replacement. Similarly, the controller 310 may be configured to modify variables used when determine the replacement cost based on whether replacements are being performed manually or in an automated fashion.

Figure 10:
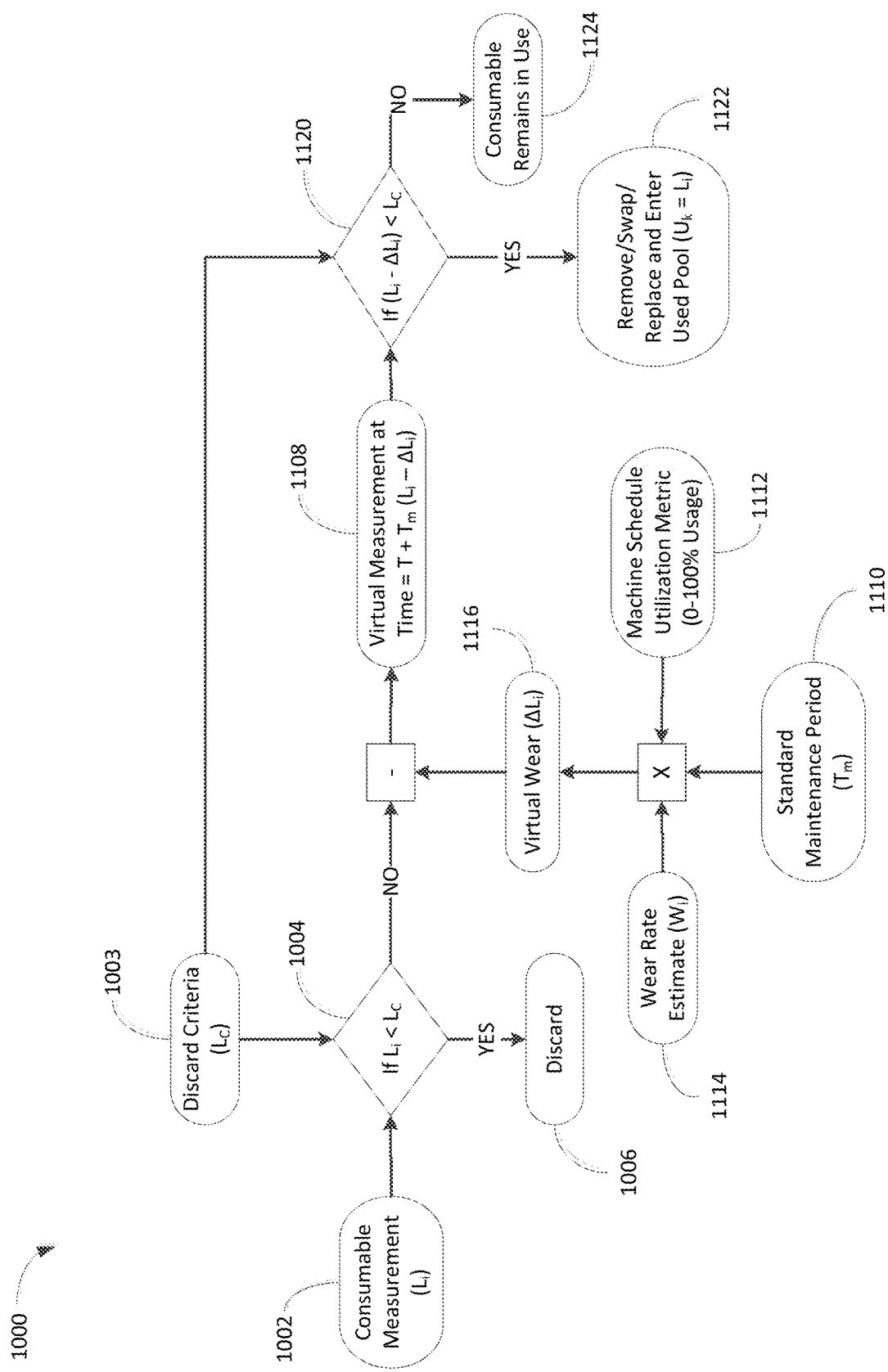
FIG. 10 is a flowchart illustrating a consumable removal algorithm performed by the system of FIG. 4 according to some embodiments.

FIG. 10 illustrates an alternative or supplemental method 1000 for determining whether to remove or swap GET, such as a tooth 152. It should be understood that the method 1000 may be used with the method 900 as described above or as an alternative to the method 900. For example, in some embodiments, the method 1000 may be used to determine whether to recommend a change-out (removal and replacement or swapping) of a component before replacement costs are determined as described above with respect to the method 900. Similarly, in some embodiments, the method 1000 may be used to detect components that, although do not currently satisfy the discard criteria, may satisfy the criteria on a subsequent inspection or maintenance cycle. Furthermore, in some embodiments, both method 900 and 1000 may be performed to determine two recommendations and the recommendations may be compared to determine a final recommendation for output.

Like the method 900, the method 1000 is described as being performed by the controller 310 (through execution of instructions by the electronic processor 312). It should be understood, however, that portions of the method 1000 may be performed by other components, including, for example, the wear detection device 302, the database 320, one or more servers (including servers provided in a cloud computing environment), or a combination thereof. Also, like the method 900, the method 1000 is described herein in terms of detecting a wear level in terms of length of a tooth 152. However, has noted above, this is just one example application of the method 100 and the method 1000 may be applied to other types of GET where wear levels may be detected or defined differently. Also, the method 1000 illustrated in FIG. 10 includes functional steps as well as some data input steps describing data that may be used as part of a particular functional steps. Accordingly, as compared to a traditional flowchart, the method 1000 is represented graphically as a hybrid of functional steps and data inputs or constraints, intermediary steps, and the like.

As illustrated in FIG. 10, the method 1000 includes obtaining a measurement of a consumable (GET), such as a length $L_i$ as described above with respect to FIG. 9 (at block 1002). The measurement $L_i$ may represent a measurement at a current time T. This measurement is compared (at block 1004) to discard criteria (1003), which, as described above, may include a discard length $L_C$. When the measurement $L_i$ is less than the discard criteria $L_C$, the consumable is discarded (at block 1006). However, when the measurement $L_i$ is not less than the discard criteria $L_C$ (for example, greater than the discard criteria), a virtual measurement is determined for the consumable at a future time (at block 1008). The future time may be based on standard maintenance period $T_m$ (1100). The standard maintenance period $T_m$ may specify a standard or historical frequency at which maintenance events occurs. For example, historically a maintenance event may be performed every forty-eight hours for a particular machine or type of machine or for a particular GET or type of GET. Accordingly, the standard maintenance period $T_m$ may be used to determine a predicted measurement of the consumable at the next maintenance event. In this regard, a consumable that hasn't yet been worn to a discard level may be replaced during a current maintenance event for efficiency purposes, such as to completely eliminate the need for a future maintenance event.

As illustrated in FIG. 10, the virtual measurement may also be based on a machine schedule utilization metric (1112), which may vary from 0% to 100% usage. The machine schedule utilization metric may be used to adjust the standard maintenance period $T_m$, such as by account for scheduled downtime or limited operation of the machine that could impact the frequency of maintenance events. Alternatively or in addition, the machine schedule utilization metric 112 may be used to adjust an estimated wear rate of the consumable $W_i$ (1114). As described above with respect to FIG. 9, a wear rate may be determined based on historical recordings (measurements) of the consumable and, optionally, other historical or standard data. Accordingly, the controller 310 may be configured to estimate a wear rate $W_i$ (as optionally adjusted by the machine schedule utilization metric) and use this wear rate $W_i$ to estimate an amount of virtual wear of the consumable $\Delta L_i$ (1116) occurring between the current time T and the next maintenance event $(T+T_m)$. The controller 310 subtracts this amount of virtual wear $\Delta L_i$ from the current measurement $L_i$ to generate the virtual measurement (at block 1008). As described above, using automated inspections provides an advantage in terms of frequency of measurements and associated accuracy in wear rate predictions.

The controller 310 compares the virtual measurement $(Li-\Delta L_i)$ to the discard criteria $L_C$ (at block 1120). When the virtual measurement $(Li-\Delta L_i)$ is not less than the discard criteria $L_C$, the consumable is maintained on the machine for continued use (at block 1124). Alternatively, when the virtual measurement $(Li-\Delta L_i)$ is less than the discard criteria $L_C$, the consumable is replaced (at block 1122). In some embodiments, if the consumable is removed (as compared to being swapped or being discarded when replaced with a new component), the consumable is also added to a used pool, which include consumables that may still be used on a machine in particular situations (since the length of the consumable is not less than the discard criteria $L_C$). The length of the consumables in the used pool may be tracked and, in this situation, the length of the consumable added to the used pool $(U_k)$ may be set to the current measurement $L_i$. In some embodiments, rather than adding the removed consumable to the used pool, the consumable may be swapped or rearranged with other consumables to minimize discarded material and optimize total cost of operations. For example, various thresholds and algorithms may be applied to determine how to use a removed consumable based on, for example, consumable costs, maintenance overhead, and the like.

Thus, the methods and systems described herein automatically detect machine wear, such as tooth wear, and use the detected wear to automatically predict tooling or component replacement. The methods and systems may predict the most effective replacement strategy and timing by monitoring real-time or near real-time wear levels and predicting a future wear level based on machine usage and historical wear rate metrics for the same machine or other similar machines. By analyzing the cost of down time combined with machine performance and wear relationships, the methods and systems may predict and prescribe replacements that optimize productivity. For example, the methods and systems may reduce machine downtime by defining the scope of replacement (labor, materials, urgency, and the like) accessible to users (maintenance crew) even before users arrive at a machine for inspection. The methods and systems remove subjective guessing, uncertainty, and crew experience from the process. In addition, the methods and systems optimize component utilization while accounting for multiple mine management considerations. Furthermore, the methods and systems collect replacement information in one or more databases accessible by one or more user devices. Accordingly, users (such as machine operators) may access replacement information even when the users are remote from the mining environment. By looking into the future state of machine components given wear and productivity data, the methods and systems provide new and unique technology for monitoring and managing replacement of machine components. Again, it should be understood that although embodiments are described herein in terms of detecting tooth wear, the methods and systems may be used to detect wear of any type of machine component including other types of ground engaging tooling. In addition, although embodiments are described herein in terms of a mining or excavating shovel, the methods and systems may be used with other types of heavy machines experiencing wear.

Various features and advantages of the invention are set forth in the following claims.

What is claimed is:

1. A system for predicting replacement of a component of an industrial machine, the system comprising:
an electronic processor configured to
determine a wear rate of the component,
determine a replacement parameter for the component, wherein determining the replacement parameter includes determining a downtime metric for the industrial machine for replacing the component, a material metric incurred when replacing the component, and an operating metric associated with not replacing the component;
determine a replacement recommendation for the component based on the wear rate and the replacement parameter; and
output the replacement recommendation.

2. The system of claim 1, wherein the electronic processor is configured to determine the wear rate of the component by receiving a current dimension of the component from a wear detection device and determining the wear rate of the component based on the current dimension of the component.

3. The system of claim 2, wherein the wear detection device includes a light detecting and ranging device.

4. The system of claim 2, wherein the industrial machine includes a mining shovel, wherein the component includes a tooth included in bucket of the mining shovel, and wherein the wear detection device is mounted on the mining shovel.

5. The system of claim 2, wherein the industrial machine includes a mining shovel, wherein the component includes a tooth included in bucket of the mining shovel, and wherein the wear detection device detects the wear level of the tooth based on a position of a dipper of the mining shovel.

6. The system of claim 2, wherein the current dimension of the component includes a current length of the component and wherein the electronic processor is further configured to determine the replacement recommendation based on a discard criteria, wherein the discard criteria includes a predetermined length of the component associated with replacing the component.

7. The system of claim 1, wherein the electronic processor is remote from the industrial machine.

8. The system of claim 1, wherein the electronic processor is configured to determine the wear rate of the component based on a current dimension of the component, historical dimensions of the component, and at least one selected from a group consisting of wear data for the industrial machine and wear data for an operating environment of the industrial machine.

9. The system of claim 1, wherein the electronic processor is configured to determine the downtime metric based on an operating schedule of the industrial machine and a time for replacing the component.

10. The system of claim 1, wherein the electronic processor is configured to determine the material metric based on an amount of usable material in the component as of a current dimension of the component.

11. The system of claim 1, wherein the electronic processor is configured to determine the operating metric based on an amount of energy consumed by the industrial machine associated with a current dimension of the component.

12. The system of claim 1, wherein the electronic processor is further configured to determine the replacement parameter for each of a plurality of arrangements of the component.

13. The system of claim 1, wherein the replacement recommendation includes a recommended type of change-out of the component, the recommended type of change-out including at least one selected from a group consisting of removing the component and replacing the component with another component and swapping the component with a used component.

14. A method for predicting replacement of a component included in an industrial machine, the method comprising:
receiving, with an electronic processor, a current dimension of the component;
determining, with the electronic processor, a virtual measurement for the component at a future time;
comparing the virtual measurement for the component to discard criteria; and
determining whether to maintain the component in use on the industrial machine or add the component to a used component pool, based on comparing the virtual measurement for the component to the discard criteria.

15. The method of claim 14, wherein determining the virtual measurement for the component includes determining the virtual measurement based on a wear rate of the component and a scheduled utilization of the industrial machine.

16. The method of claim 14, wherein determining the virtual measurement for the component determining the virtual measurement for the component at a next maintenance event.

17. The method of claim 14, wherein determining whether to maintain the component in use or add the component to the used component pool includes:

maintaining the component in use on the industrial machine in response to the virtual measurement for the component being greater than the discard criteria; and
adding the component to the used component pool in response to the virtual measurement for the component being less than the discard criteria.

18. The method of claim 14, further comprising, in response to the virtual measurement for the component being less than the discard criteria, changing-out the component, wherein changing-out the component includes at least one of replacing the component with another component and swapping the component with a used component.

19. Non-transitory, computer-readable medium storing instructions that, when executed by an electronic processor, perform a set of functions, the set of functions comprising:
determining a replacement parameter for a component of an industrial machine for each of a plurality of arrangements, wherein determining the replacement parameter includes determining a downtime metric for the industrial machine for replacing the component and an operating metric for the industrial machine associated with not replacing the component;
determining a replacement recommendation for the component based on the replacement parameter associated with each of the plurality of arrangements; and
outputting the replacement recommendation.

20. The non-transitory, computer-readable medium of claim 19, wherein the set of functions further comprising determining a wear rate of the component based on a current dimension of the component and historical dimensions of the component and wherein determining the replacement recommendation for each of the plurality of arrangements includes determining the replacement recommendation for each of the plurality of arrangements based on the replacement parameter, the wear rate, and discard criteria.

* * * * *